US010119524B2

(12) United States Patent
Teerlink

(10) Patent No.: US 10,119,524 B2
(45) Date of Patent: Nov. 6, 2018

(54) INERTIAL ENERGY ACCUMULATING DEVICE

(71) Applicant: S4 Energy B.V., Rotterdam (NL)

(72) Inventor: Peter Teerlink, Rotterdam (NL)

(73) Assignee: S4 Energy B.V., Rotterdam (NL)

( * ) Notice: Subject to any disclaimer, the term of this patent is extended or adjusted under 35 U.S.C. 154(b) by 318 days.

(21) Appl. No.: 14/901,121

(22) PCT Filed: Jul. 2, 2014

(86) PCT No.: PCT/NL2014/050430
§ 371 (c)(1),
(2) Date: Dec. 28, 2015

(87) PCT Pub. No.: WO2015/002532
PCT Pub. Date: Jan. 8, 2015

(65) Prior Publication Data
US 2016/0138573 A1    May 19, 2016

(30) Foreign Application Priority Data
Jul. 4, 2013   (NL) ...................................... 2011095

(51) Int. Cl.
*F03G 3/08*       (2006.01)
(52) U.S. Cl.
CPC ...................... *F03G 3/08* (2013.01)
(58) Field of Classification Search
CPC ........ F03G 3/08; F03D 9/12; F05B 2260/421; F05B 2270/326; F05B 2270/327; F05B 2270/404; F05B 2270/602; F04D 15/0044; F04D 15/0094; F04D 15/0245; F04D 15/0272; F04D 15/0281
See application file for complete search history.

(56) References Cited

U.S. PATENT DOCUMENTS

| 2004/0219007 A1 | 11/2004 | Tavarez |
| 2008/0122308 A1* | 5/2008 | Mleux ................... F16C 32/044 310/90.5 |
| 2009/0322080 A1 | 12/2009 | Ruiz Minguela et al. |

FOREIGN PATENT DOCUMENTS

WO    2010068090 A2    6/2010

OTHER PUBLICATIONS

International Search Report and Written Opinion of Application No. PCT/NL2014/050430 dated Nov. 21, 2014 8 pages.

\* cited by examiner

*Primary Examiner* — Richard Edgar
*Assistant Examiner* — Danielle M Christensen
(74) *Attorney, Agent, or Firm* — Thomas | Horstemeyer, LLP

(57) ABSTRACT

The invention relates to a device for accumulating inertial energy having a rotor chamber in housing, a rotor in the rotor chamber having a first end face and a substantially opposite second end face, the rotor being mounted, so that it can be displaced and rotate relative to the housing leaving free a gap between the outer rotor perimeter and the inner perimeter of the rotor chamber, wherein a seal is provided in said gap separating a first section of the rotor chamber and a second section of the rotor chamber, exposing means; creating a differential pressure over the rotor for levitation thereof, wherein the device further comprises stabilizing means for counteracting vibration of the rotor.

11 Claims, 4 Drawing Sheets

INERTIAL ENERGY ACCUMULATING DEVICE

CROSS-REFERENCE TO RELATED APPLICATION

This application is the National Stage of International Application No. PCT/NL2014/050430, filed 2 Jul. 2014, which claims the benefit of NL 2011095, filed 4 Jul. 2013, the contents of which are incorporated by reference as if fully set forth herein.

FIELD OF THE DISCLOSURE

The present invention relates to an inertial energy accumulating device allowing, for example, absorbing the fluctuations in the production and/or consumption of energy, which are associated with a unit for producing energy, such as an electromotor or wind turbine. A device of this type may also be used to recuperate and then restore or use in some other way a retarding and/or slowing power. The device according to the invention may also be used to stabilize a rotational speed.

BACKGROUND

Various types of energy storing systems are known. One type is based on flywheels, that is to say on at least one mass set in rotation by input of energy, which will continue to rotate, under inertia, after the energy input has ceased. The rotating mass is connected to a motor which constitutes a means of inputting energy during the energy-storage periods, or a generator during energy-restoring periods. The heavier the flywheel and the more able it is to rotate quickly with the lowest possible friction, the greater the amount of energy that can be stored. Mounting of the flywheel bearings is therefore of key importance.

In some types of flywheel the bearings are partially relieved of the weight of the flywheel by applying an electromagnetic force.

Another type of flywheel is described in PCT application PCT/NL2009/000248. This flywheel based inertial energy accumulation device comprises a frame and at least one flywheel mounted so that it can rotate relative to the frame about an axis of rotation, as well as means for exposing at least one face of the flywheel to a gas pressure which, by comparison with the pressure applied to a substantially opposite face of the flywheel, generates an upward differential pressure force that at least partially compensates for the weight of the flywheel, such as by means of so-called gas flow restricting means (also referred to as a seal in the present application) surrounding the face of the flywheel that is exposed to the gas pressure. It is stated that in this device not only the flywheel bearings are relieved at least partially of the weight of the flywheel, thus increasing their life, but the cost per kWh is also greatly reduced. These gas flow restricting means make it possible to create a drop in pressure head in the leakage space. These means are typically formed between the flywheel and a surface integral with the frame. In an embodiment these flow slowing means comprise a labyrinth seal. In such a seal, the gas flow path comprises a succession of special surface features that generate drops in pressure head ("head drops"). For example, the cross section for the passage of the gas is alternately reduced and enlarged.

In practice, stability and safety of this device leave something to be desired. In general, the vulnerability of the seal is high. In case of emergency, for example failure, defect, accident and the like serious damage to the precisely, often tailor made, special features of the seal is most likely to occur because of (friction) contact between the rotor and the seal. The rotor itself may also become damaged.

It has also appeared that in use there is a risk of unbalanced rotation and/or uncontrolled vibration of the rotor, e.g. in the direction of the rotation axis, which may in certain cases involve a self-attenuating effect. Uncontrolled vibration makes the device less energy efficient and may result in damage of the rotor and other components of the device, such as the seal and housing. This is highly undesirable.

SUMMARY

In general the present invention is directed to improving safe operation of such a device.

More particularly, the present invention aims at reducing the risk of uncontrolled vibration of the rotor, most particularly in direction of its axis of rotation.

To this end the device according to the invention also comprises stabilizing means for counteracting vibration of the rotor.

The device according to the invention comprises a rotor (flywheel) mounted in a chamber that is defined by the housing. The housing having walls, such as a bottom wall, a (cylindrical) upstanding wall and a top wall, is generally airtight sealed to the environment. The interior of the housing defines a rotor chamber, in which—by means of a supporting structure, such as one or more bearings like a pivot bearing (thrust bearing)—the rotor such as a flywheel is mounted. The rotor is capable of rotation about an axis of rotation, preferably a vertical axis of rotation. The rotation shaft of the rotor may extend from both end faces of the rotor into suitable bearings that are provided in the top and bottom of the housing. Alternatively the rotor is only supported by lower bearings. The rotor can be coupled to a means for inputting energy such as an electromotor or wind turbine during storage times and to a generator during discharge periods for delivering energy to one or more appliances. The rotor having a relatively high weight has an outer perimeter, defined by a first end face and an opposite second end face and a side wall that connects the two end faces. A gap is present between the outer perimeter of the rotor and the inner perimeter of the housing. A gas permeable (i.e. allowing flow of gas) seal as gas flow restricting means is provided in the gap. This seal divides the rotor chamber into a first section of the rotor chamber and a second section of the rotor chamber. The first end face of the rotor is contained in the first section at least partly, while the opposite second end face is contained in the second section. The device also comprises a means for exposing at least the first end face of the rotor in the first section to a gas pressure which, by comparison with the pressure exerted on the substantially opposite second end face in the second section generates a differential pressure force that at least partially compensates for the weight of the rotor. This pressure difference is mainly generated by the seal. Generally gas will be blown—or sucked away in sub atmospheric operation—almost from one or more positions in the housing, e.g. the bottom thereof centred around the vertical rotation axis in case of a rotor having a vertical axis of rotation, while a concentric seal is positioned concentrically with the vertical axis of rotation. Thus in order to reduce the load on the supporting structure such as bearings a differential gas pressure is applied over the rotor, causing levitation thereof. In view of minimizing the flow of gas from the first section to the second section of the chamber the distance between seal and rotor and thus the levitation height is kept small, usually in the orders of tens of micrometers, but sufficiently free of friction from the supporting structure. During operation the rotor rotates freely from the housing and the levitation height is kept constant by controlling the gas flow.

High rotation speed and/or gas flow variations may cause the rotor to vibrate in the direction of its rotation axis. Principally an increase of the gap at the seal at constant gas flow conditions would be counteracted more or less automatically, because the differential gas pressure would reduce and thus the levitation height would decrease. However, any instability of rotation could be larger and more powerful than the controlling power of the gas flow and/or the self-regulating effect of the design. Therefore the device according to the invention also comprises stabilizing means for counteracting this vibration. The stabilizing means suppress the vibration in the direction of the axis of rotation, thereby improving the efficiency of the energy storage by the rotor and reducing the risk of damage and/or failure.

In a preferred embodiment the stabilizing means are actively controlled. Actively controlled stabilizing means respond to an observation or determination that such vibration occurs and compensate the vibration, at least partially. Once vibration has been determined, optionally above a certain threshold value in amplitude, frequency and/or duration, the stabilizing means are activated and apply a counteraction to the rotor, e.g. a vibration having characteristics opposing the determined rotor vibration. Advantageously vibration is determined by distance measurement means such as laser means, for determining the distance between a stationary part of the housing, and at least an opposite part of the rotor, preferably on a continuous basis. These measurement means are operationally connected to control means for actuating the stabilizing means based on signals representing rotor vibration determined by the distance measurement means. Suitably distance measuring apparatus, which is usually present for watching the gap width, preferably at the seal, and which apparatus controls gas flow, is used for this purpose. However, one or more separate devices enabling determination of vibration, at other locations are equally suitable.

The stabilizing means act preferably on the rotor shaft. In a particular embodiment the rotor has a vertical rotation shaft. Then the levitating differential pressure is applied between the bottom end face in the lower section of the rotor chamber and the top end face of the rotor in the upper section.

A preferred example of stabilizing means is a voice coil actuator, because of its quick response and simplicity. A voice coil actuator in its simple form comprises a tubular coil of wire situated within a radially oriented permanent magnetic field, through which coil current flows. The force thus generated results in a relative motion between the magnet assembly and the coil. Usually one of the magnet assembly and the coil will have a fixed position. More preferably the stabilizing means comprises at least one voice coil linear actuator, causing an axially directed force on the rotor shaft. Then the voice coil linear actuator is most preferably positioned on top of the rotation shaft.

In view of energy efficiency considerations the flow of gas into the gap is preferably small, but sufficient for levitation of the object. This requires a sufficient pressure drop over the seal between the first and second section. A very small gap width in the seal, in the order of tens of micrometers to hundreds of micrometers, e.g. less than 100 micrometer, such as 50 micrometer, has proven to be successful.

Advantageously the seal is located on a movable part enabling to set up such a small gap. Then adjusting means allow for an accurate positioning of the movable part and thus the seal at the level of micrometers. Actual levitation of the rotor during operation is controlled primarily by adjusting the gas flow upon flow fluctuations. Further adjustment of the movable part by means of the adjusting means may contribute in stabilizing the position of the rotor with respect to the housing. The latter is a slow adaptation compared to flow control. The seal in the gap between the inner walls of the housing and the respective face(s) of the rotor allows a restricted flow of gas from the bottom section of the chamber to the upper section thereof. Advantageously the seal, preferably supported by the movable part, is a labyrinth seal, comprising—as seen in the direction of flow of the gas supplied or sucked away—a series of projections and/or grooves that create drops in pressure head, in the face of the seal opposite the rotor. Typically, the cross-section for the passage of gas in the gap is reduced and enlarged in an alternating manner. The co-operating face of the rotor is substantially flat.

In a further preferred embodiment the seal is concentrically with the vertical axis of the rotor. Preferably the seal is arranged at a radial distance of 30-70% of the radius of a cylindrical chamber predominantly determined by a balance between the area available for levitation and the volume of the rotor chamber.

Preferred adjusting means for adjusting the position of the seal supported by a movable part are means for adjusting the height position of a vertically movable part of the bottom of the housing with respect to the height position of the supporting structure. Preferred adjusting means are selected from the group comprising piston-cylinder assemblies, motors, spindles, linear actuators, electromagnets. Pneumatic piston-cylinder assemblies are most preferred. Advantageously the seal comprises at least one annular protrusion and/or annular recess in its face opposite the rotor. This recess is advantageously connected to a means for discharging gas, such as a suction pump, via respective conduits, thereby causing a sufficient pressure drop over the seal. Preferably the movable part comprises a body provided with a gas flow channel having a first end in fluid communication with said recess and having a second end in fluid communication with a means for sucking gas from the recess.

In a further preferred embodiment thereof the seal comprises multiple annular recesses, preferably concentrically arranged around the vertical axis of the rotor, wherein at least two recesses each are connected to suction means for sucking gas from the respective recesses. Thus the suction at these recesses can be controlled individually, thereby allowing stepwise reduction of the gas pressure from the first section to the second section over the seal. E.g. the seal may comprise three recesses, each having its own suction points and each connected to its own pump or the like. The first one reduces the gas pressure from about 500-100 mbar to 200-50 mbar, the second further down to 100-10 mbar and the third to 1-0.005 mbar. Stepwise reduction of the gas pressure over the seal is preferred in view of 10 energy losses by friction and energy consumption by the pumps. Thus preferably the seal comprises multiple annular recesses, of which at least two recesses each are in fluid communication with first ends of associated gas flow channels in the body of the movable part supporting the seal, and wherein second ends thereof are in fluid communication with suction means for sucking gas from these recesses. The suction means are preferably designed such that the pressure over the seal is outwardly radially reduced stepwise.

The or each suction means can comprise at least one pump, of which the suction side is connected to a recess and the discharge side is connected to the exposing means. In this way a substantially closed loop for circulation of gas is established.

In an advantageous embodiment the exposing means are designed in such a way that the 20 absolute gas pressure in the first section exerted on the bottom end face of the rotor is less than atmospheric pressure, e.g. in the range of 100-500 mbar. Preferably the second or upper section is maintained at a pressure of less than 10 mbar, more preferably less than mbar and most preferably less than 2 mbar, such as 1 mbar. Then friction of the spinning rotor in an almost vacuum upper section is small.

Optionally, the device according to the invention also comprises an auxiliary means for reducing the pressure in the second upper section in addition to the other means discussed above. This means such as a pump is actuated during start up and creates a vacuum in the second section and effectively "pulls" the rotor to a higher level. Once the rotor is in operation position, the action of this auxiliary means can be stopped.

Advantageously the gap width, in particular at the seal, is monitored on a continuous basis. As said, control of the gap width during operation is predominantly carried out by adjusting the gas flow for levitation. In case of an emergency, e.g. indicated by a change of the gap width beyond a predetermined level or range, the monitoring means are designed to activate the adjusting means for retracting the seal supported by the movable part into the respective housing section.

In a further preferred embodiment the device according to the invention also comprises means for determining displacement of the rotor with respect to the supporting structure, more preferably means for determining vertical displacement of the rotor having a vertical axis of rotation with respect to a supporting (pivot) bearing.

The device may comprise a heat exchanger between the gas suction side and the gas delivery side for cooling the gas. During use the gas heats up due to compression and/or friction between the gas and the rotor. In order to prevent thermal damage to the device the heat exchanger cools the gas when not in contact with the rotor.

The gas sucked in and/or delivered is preferably predominantly made up of air, hydrogen or helium, because of their low coefficients of friction and low viscosities. Generally helium is preferred on account of its stability and its low coefficient of friction.

The rotor may be a hollow cone rotor, wherein the mass is concentrated in the outer walls and faces. This is in particular applicable to industrial applications. In a preferred embodiment, e.g. for relatively small domestic applications, the object is solid, e.g. made from reinforced concrete or metal. If necessary, the object may be reinforced by reinforcing elements like crossed spokes.

A particular use of an inertial energy accumulating device according to the invention is directed to absorbing fluctuations in the production and/or consumption of energy which are associated with a unit for producing energy, particularly electrical energy, particularly using a wind turbine.

Typically such an inertial energy accumulating device according to the invention is connected to a motive source, such as a wind turbine, a motor powered by solar energy, or electromotor in order to charge the rotor. Discharging typically occurs through a generator in order to convert the rotational speed of the rotor into electricity.

BRIEF DESCRIPTION OF THE DRAWINGS

The several aspects of the invention are further illustrated by the attached drawing, wherein.

DETAILED DESCRIPTION

Figure 1:
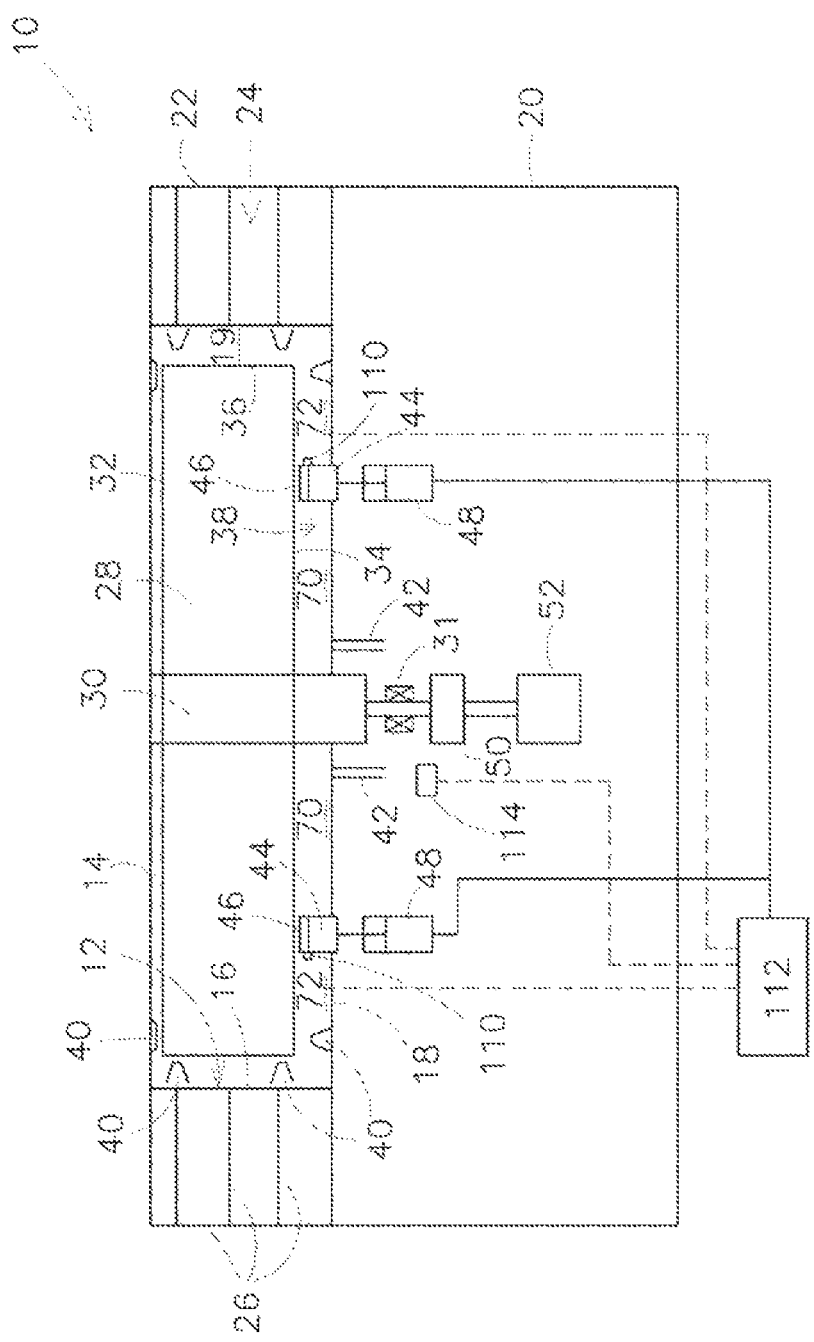
FIG. 1 is a schematic overall presentation of an embodiment of the device according to the invention.

In the following detailed discussion of the various embodiments shown in the FIGS. 1-3 similar parts are indicated by the same reference numerals.

An inertial energy accumulating device according to the invention comprises a generally cylindrical housing 12 having top wall 14, e.g. a detachable circular cover plate, a cylindrical 35 upstanding wall 16 and a bottom 18. The interior of the housing 12 defines a rotor chamber 19. The housing 12 may be contained in a tray type tank 20. The top wall 14 extends till the upstanding wall 22 of the tank 20. Between the upstanding walls 14 and 22 respectively a crumple zone 24—diagrammatically shown by 3 annular plates 26—is present in this embodiment for limiting damage in case of failure. A disc shaped rotor 28 having a relatively large diameter compared to its thickness is mounted in the rotor chamber 19, such that the rotor is able to rotate about its vertical axis of rotation 30. In this embodiment the shaft 30 is held in a supporting structure, here suitable pivot bearings 31 in the bottom. The rotor 28 has 5 a top end face 32, a bottom end face 34 and a cylindrical upstanding wall 36 between the end faces 32 and 34. The rotor may be massive. In case of a non-massive rotor preferably the weight will be present at the outer periphery of the rotor. Between the housing 12 and rotor 28 a small gap 38 (for sake of clarity the figure is not drawn to scale) is present, except at the position of vertical shaft 30. Bumper blocks 40 are provided on the cylindrical wall 16 of 10 housing 12 opposite to cylindrical wall 36 of the rotor 28, as well as near the periphery of the rotor on the top wall 14 and bottom wall 18 respectively. In case of unbalanced rotation, the rotor 28 collides with these blocks 40 thereby braking the rotor rotation and limiting damage. Reference numeral 42 indicates gas inlets, through which by means of a pump (not shown in FIG. 1) gas is blown against or sucked away from the lower end face 34 thereby providing an 15 upward force. In this embodiment the bottom 18 comprises an annular ring shaped part 44, which is able to move in vertical direction. The upper face of part 44 is provided with a seal 46, as shown in more detail in FIGS. 2 and 3. Pneumatic piston cylinders 48 are provided as means for displacing the bottom part 44 vertically. An (electromagnetic) coupling 50 connects the shaft 30 to a device 52 for inputting energy in case of storage of energy or a generator in 20 case of discharge.

Figure 2:
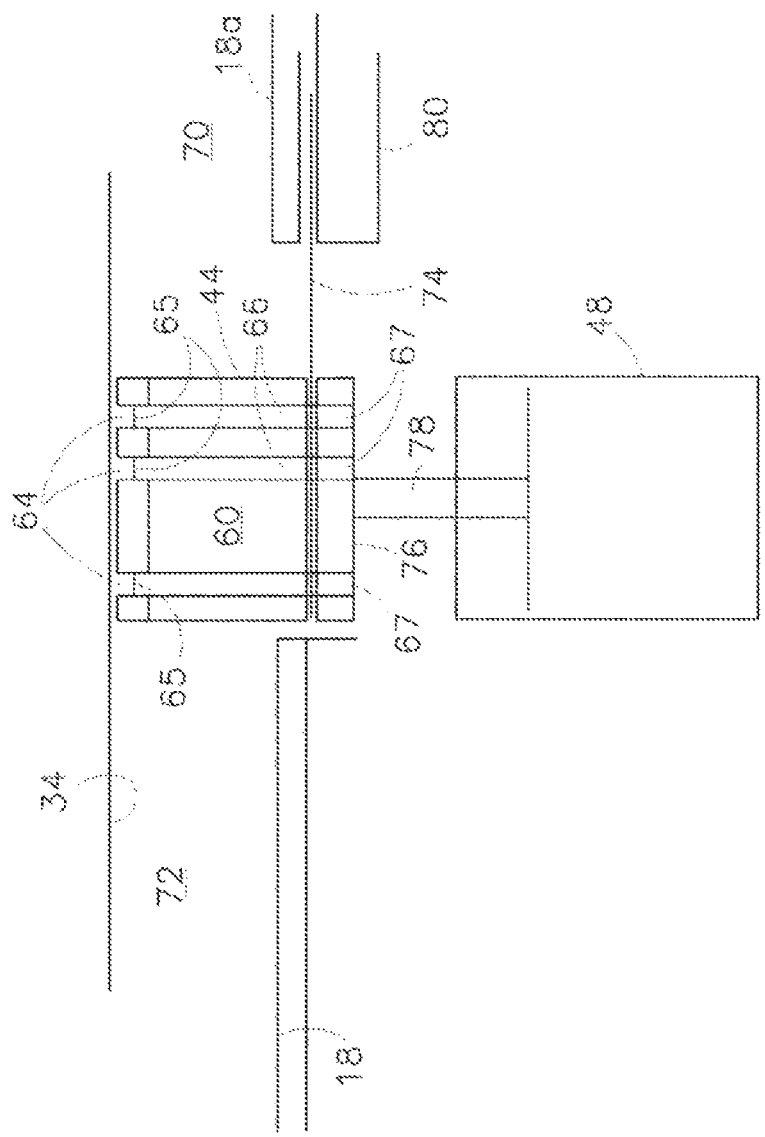
FIG. 2 is a schematic presentation of an embodiment of the a moveable bottom part of a device according to the invention.

FIG. 2 is a detail of an embodiment of a device according to the invention, showing in cross section the moveable bottom part 44 in relation to the substantially flat bottom end face 34 of the rotor 28 and bottom 18 of the housing 12. The movable bottom part 44 comprises an annular body 60, of which the top face is provided with a labyrinth seal 46 comprising a 25 number of concentric recesses or grooves 64. At the bottom these recesses 64 have outlets 65, preferably slit shaped outlets continuing into bell shaped canals 66 in the body 60, which at the other ends 67 are connected to pumps 68 (see FIG. 3). In order to prevent leakage of gas from the first section 70 of the rotor chamber e.g. having a pressure of about 300 mbar to the second section 72, wherein the pressure is very low, a flexible gas impermeable seal 74, 30 is provided between bottom part 18a and part 44. In the embodiment shown the seal 74, e.g. an annular thin sheet, e.g. made from plastic or metal foil is clamped between the body 60 and a support 76 on piston rod 78 of piston cylinder assembly 48 at the outer circumference and similarly between bottom part 18a and a lower clamping ring 80, e.g. using bolts (not shown). Thus gas introduced for lifting the rotor 28 flows from the first section 70 via seal 46 35 in the direction of the second section 72 having a pressure of e.g. 1 mbar, while gas is sucked from the recesses 64. In this way pressure is reduced in a stepwise manner, which is favourable in view of economics and safety.

Figure 3:
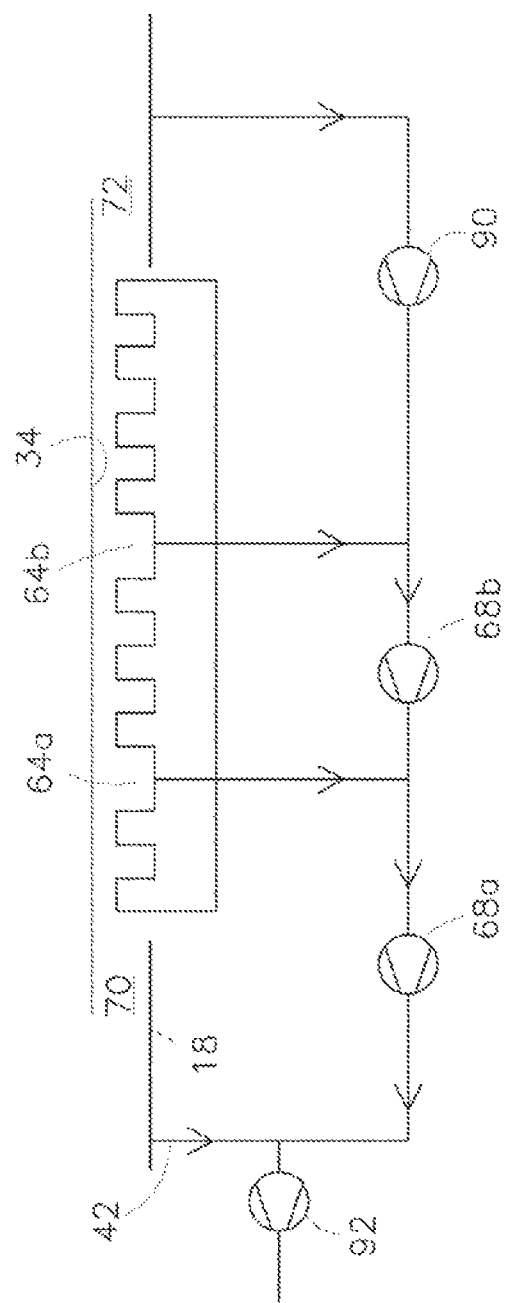
FIG. 3 is a schematic presentation of an embodiment of the pressure reduction in a seal of a device according to the invention.

FIG. 3 shows a typical example. During operation whether during charge or discharge of the device, when the upper section 72 is evacuated from gas by means of suction pump 90, a suitable pressure difference is maintained through pump 92 via inlets 42 forcing the rotating rotor 28 upward, until the lifting force and rotor weight are balanced. In the embodiment of FIG. 3 the pressure is reduced from the first section 70 to a pressure of e.g. 110 mbar by means of 5 pump 68a in the first recess 64a, by means of pumps 68a and 68b to 30 mbar in recess 64b and further down to a pressure of 1 mbar in second section 72 using pumps 68a, 68b and 90. Typically the flow rate of the gas is low at recess 64b and high at 64a.

Returning to FIG. 1, the distance of the rotor from the seal 46 is determined at one or more distance measurement devices 110, the output of which is processed in controller 112, which 10 regulates the piston cylinder assemblies 48 in order to set the gap between seal 46 and rotor bottom 34 at the start of operation. Main control of the gap width during operation is carried out by regulating the gas flow. If data from the distance measurement device(s) 110 as examples of monitoring means as processed by the control means 112 indicate an unacceptable deviation from predetermined values, then the control means 112 activate the 15 adjusting means 48 in order to retract the movable seal supporting part 44 and/or the exposing means 42. Also in case of leakage or gas flow variations the system of the invention contributes to maintaining a steady and safe performance.

Reference numeral 114 indicates means for determining vertical displacement of the shaft 30. Operation of the device is as follows. In its rest position the height adjusting means 48 20 supporting the bottom part 44 and seal 46 are retracted and the rotor 28 is carried by its supporting structure 31 and/or the bumper blocks 40. Then the height adjusting means 48 are actuated and the seal 46 abuts the bottom end face 34 of rotor 28. Next the various pumps 90, 92 for levitating the rotor 28 by creating a upwardly directed differential pressure force are operated. The rotor 28 is then carried by a gas cushion. Then the height position of the seal 25 46 is further increased at constant gas flow, thereby further raising the rotor 28 until the axis 30 thereof no longer bears on the supporting structure 31, e.g. monitored using means 114, and thus the load on bearing 31 is relieved.

Figure 4:
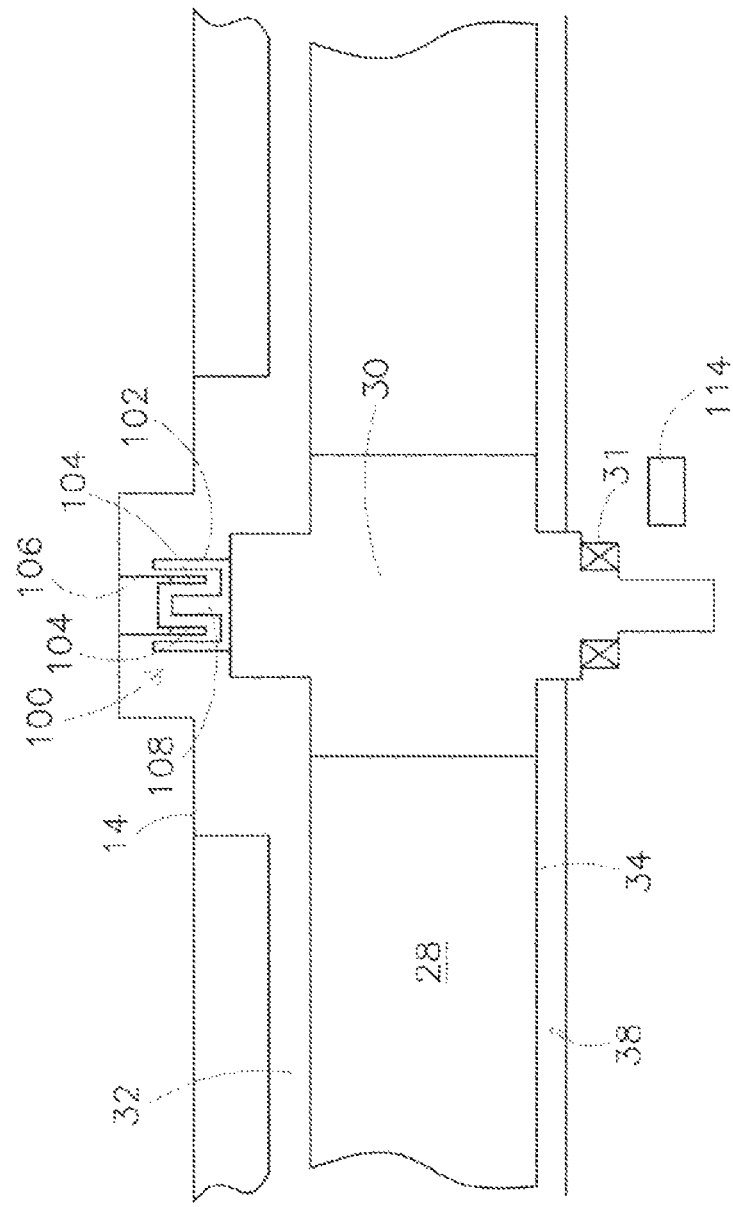
FIG. 4 is a schematic presentation of an embodiment of a stabilizing means according to the invention.

FIG. 4 shows an embodiment of stabilizing means 100 for counteracting uncontrolled vibration. These stabilizing means 100 comprise a voice coil actuator, comprising a 30 ferromagnetic cylinder 102 having permanent magnets (not shown) embedded on the inside diameter thereof establishing a radially oriented magnetic field. A tubular coil of wire—represented by reference numeral 104 and carried by coil support 106—is arranged within the cylinder 102 spaced apart from the magnets by an air gap. An inner core 108 of ferromagnetic material positioned along the centreline of the coiled wire 104 and connected to 35 the cylinder 102 completes the magnetic circuit. The cylinder 102 is positioned on top of the rotor shaft 30. Upon detection of vibration of the rotor 28 the means 100 are activated and controlled to counteract the vibration as determined.

The invention claimed is:

1. A device for accumulating inertial energy, comprising a housing defining a rotor chamber, a rotor having a first end face and a substantially opposite second end face, the rotor being mounted in the rotor chamber, so that it can be displaced relative to the housing and so that it can rotate relative to the housing about an axis of rotation leaving free a gap between the outer rotor perimeter and the inner perimeter of the rotor chamber, wherein a seal is provided in said gap separating a first section of the rotor chamber and a second section of the rotor chamber, a pump for exposing at least the first end face of the rotor in the first section to a gas pressure, which, by comparison with the pressure exerted upon the substantially opposite second end face in the second section, generates a differential pressure force that at least partially compensates for the weight of the rotor, wherein the device further comprises stabilizing means for counteracting vibration of the rotor.

2. The device according to claim 1, wherein the stabilizing means are actively controlled.

3. The device according to claim 1, wherein the rotor has a vertical rotation shaft, and wherein the stabilizing means act on the vertical rotation shaft.

4. The device according to claim 1, wherein the stabilizing means comprise at least one voice coil actuator.

5. The device according to claim 4, wherein the at least one voice coil actuator comprise at least one voice coil linear actuator.

6. The device according to claim 5, wherein the at least one voice coil linear actuator is positioned on top of the vertical rotation shaft of the rotor.

7. The device according to claim 1, further comprising means for determining displacement of the rotor with respect to a supporting structure of the device.

8. The device of claim 7, wherein the means for determining displacement comprise means for determining vertical displacement of the rotor with respect to a supporting bearing of the device.

9. The device according to claim 2, wherein the rotor has a vertical rotation shaft and wherein the stabilizing means act on the vertical rotation shaft.

10. The device according to claim 2, wherein the stabilizing means comprise at least one voice coil actuator.

11. The device according to claim 3, wherein the stabilizing means comprise at least one voice coil actuator.

* * * * *